United States Patent
Bogard (12) United States Patent (10) Patent No.: US 7,278,674 B1
(45) Date of Patent: Oct. 9, 2007

(54) PICK-UP TRUCK CARGO COVER

(76) Inventor: Donald E. Bogard, #1 Levelwind Ct., Greensboro, NC (US) 27455

( * ) Notice: Subject to any disclaimer, the term of this patent is extended or adjusted under 35 U.S.C. 154(b) by 0 days.

(21) Appl. No.: 11/441,883

(22) Filed: May 30, 2006

(51) Int. Cl.
*B60P 7/02* (2006.01)

(52) U.S. Cl. ............ 296/100.06; 296/100.07; 296/100.09

(58) Field of Classification Search ......... 296/1.04, 296/100.02, 100.06, 100.07, 100.09
See application file for complete search history.

(56) References Cited

U.S. PATENT DOCUMENTS

| | | | | |
|---|---|---|---|---|
| 6,059,350 | A * | 5/2000 | Kooiker | 296/100.09 |
| 6,082,806 | A * | 7/2000 | Bogard | 296/100.09 |
| 6,227,602 | B1 * | 5/2001 | Bogard | 296/100.09 |
| 6,234,559 | B1 * | 5/2001 | Block et al. | 296/100.06 |
| 6,422,635 | B1 * | 7/2002 | Steffens et al. | 296/100.09 |
| 2001/0035664 | A1 * | 11/2001 | Steffens et al. | 296/100.09 |
| 2004/0245799 | A1 * | 12/2004 | Rusu | 296/100.06 |

* cited by examiner

*Primary Examiner*—Jason S Morrow
(74) *Attorney, Agent, or Firm*—Alex Rhodes (57) ABSTRACT

A cover for enclosing a cargo box of a pick-up truck which is manufactured from an inventory of common parts. The cover is a pair of rectangular panels pivotally connected with a hinge for rotation about a transverse axis on the cargo box. Each of said panels is bounded by a pair of slender spaced apart side members, a slender inner transverse member and a slender spaced apart outer transverse member. The transverse and side members are cut from unspecified lengths of extruded stock to conform to the length and width of the cargo box. End portions of the transverse and side members are joined with molded plastic elbows to form outer corners. The hinge is covered with a thin rubber seal to prevent water from entering the cargo box. A plurality of slender longitudinal support members between the side members are joined to the inner and outer transverse members with S-clip fasteners. A safety latch limits the opening of an improperly latched cover.

8 Claims, 10 Drawing Sheets

PICK-UP TRUCK CARGO COVER

FIELD OF THE INVENTION

This invention relates to cargo covers and more particularly to a rigid cover for enclosing cargo in a pick-up truck.

BACKGROUND OF THE INVENTION

Cargo covers are popular accessories with truck owners. They improve truck appearance, provide security and prevent water from damaging cargo. They are available as soft and rigid covers and vary in size and shape. Rigid covers are preferred, however, because of high investment costs, it is not profitable to produce rigid covers for many older trucks, imported trucks and/or trucks which are manufactured in small quantities.

Many dealers are unwilling to stock rigid covers for all models. The current practice is to order covers "just in time." Covers which could be manufactured "just in time" rather than stocked in inventories would provide a manufacturer with a substantial advantage over existing covers. If the covers could be manufactured from common parts, the advantage would be higher. If the investment in tools was low, the competitive advantage would be even higher. If the common parts could be used to manufacture covers for all trucks, including older, imported and low volume trucks, the advantage would be still greater.

One deficiency with current covers is that they suddenly open, if improperly latched, causing cover damage and loss of cargo. Another deficiency is that they are difficult to install and align with cargo boxes. Misaligned covers adversely affect appearance and function.

In my U.S. Pat. No. 6,082,806, I have disclosed a pick-up truck cover which has a number of advantages over existing covers. One advantage is that it can be sold as either a kit or an assembled cover. Another advantage is that it can be manufactured from an inventory of common parts. Another advantage is that it can be assembled at a point of sale. Another advantage is that it can be assembled with simple tools, such as wrenches, pliers, hacksaws and hand drills. Another advantage is the inventory of common parts can be used to manufacture covers for older and limited production trucks. Another advantage is that it is easy to install.

SUMMARY OF THE INVENTION

The present invention is an improvement over U.S. Pat. No. 6,082,806 which is incorporated herein by reference. The invention resides in the features and improvements over my earlier patent, some of which are believed to be novel in themselves.. One improvement is an improved bracket for clamping the cover to a cargo box. Another improvement is the addition of a rubber seal to the hinge that pivotally connects cover panels. Another improvement is an improved striker for locking the cover to a cargo box. Another improvement is an improved tailgate latch. Another improvement is the elimination of adhesive bonding of cover members. Another improvement is the addition of a safety latch for restraining an improperly latched cover. Another improvement is the substitution of a stamped S-clip fastener for rivets and/or drive screws for reducing assembly time and cost.

Several alternate embodiments have been added from the inventory of common parts. The added embodiments demonstrate the versatility of the invention. One embodiment is a single cover panel for reducing cost. Another embodiment is a three panel design consisting of two common rotatable panels and one fixed panel. The length of the fixed panel is varied to accommodate differences in cargo box length. Another embodiment is the combination of a cover, tool box and common lock for locking the cover and toolbox. All of the embodiments are based on an inventory of common parts.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

DETAILED DESCRIPTION OF THE PREFERRED EMBODIMENT

Figure 1:
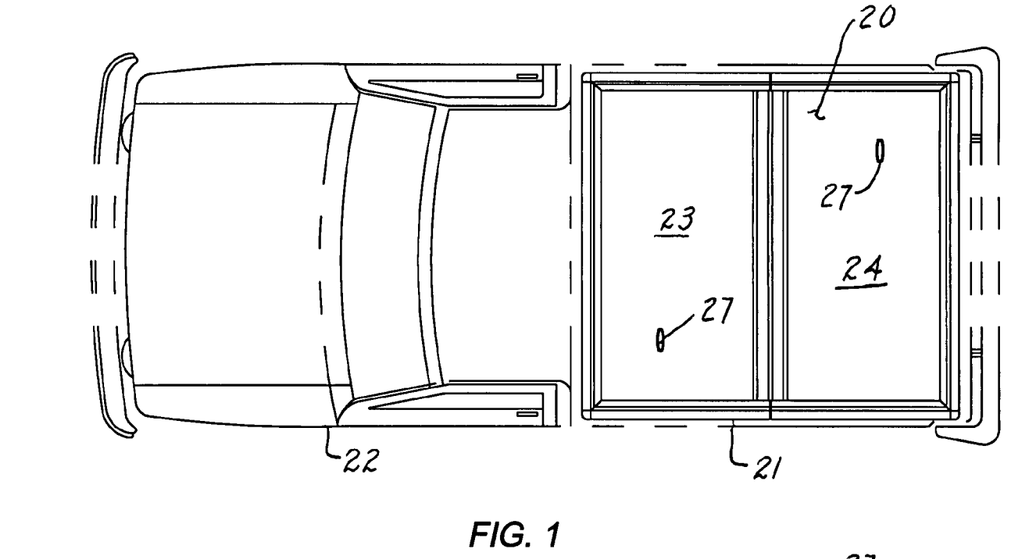
FIG. 1 is a plan view of a pick-up truck cover mounted on a truck according to the present invention.
Figure 2:
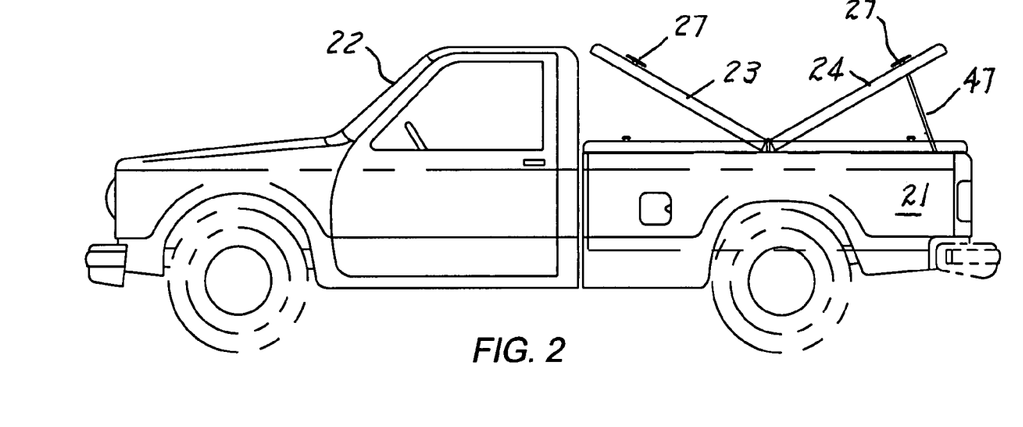
FIG. 2 is a side view of the pick-up truck cover and truck.

Referring now to the drawings wherein like numerals designate like and corresponding parts throughout the several views, a truck cover 20 is shown in FIGS. 1 and 2 mounted on a cargo box 21 of a pick-up truck 22.according to the present invention. The basic strategy with this invention is to use an inventory of common parts, consisting mainly of unspecified lengths of extruded aluminum bars and rolls or sheets of fiberglass rolls or sheets to manufacture covers "just in time" for all trucks. One benefit of the invention is that manufacturing can be automated to reduce labor and assembly costs. Another benefit is that there is no obsolescence with the introduction of new trucks.

The aluminum extrusions are made with relatively low cost extrusion dies. They are dimensionally accurate, reduce weight and have relatively good surface finishes. They can be used unfinished, anodized or covered with a variety of paint finishes.

Figure 3:
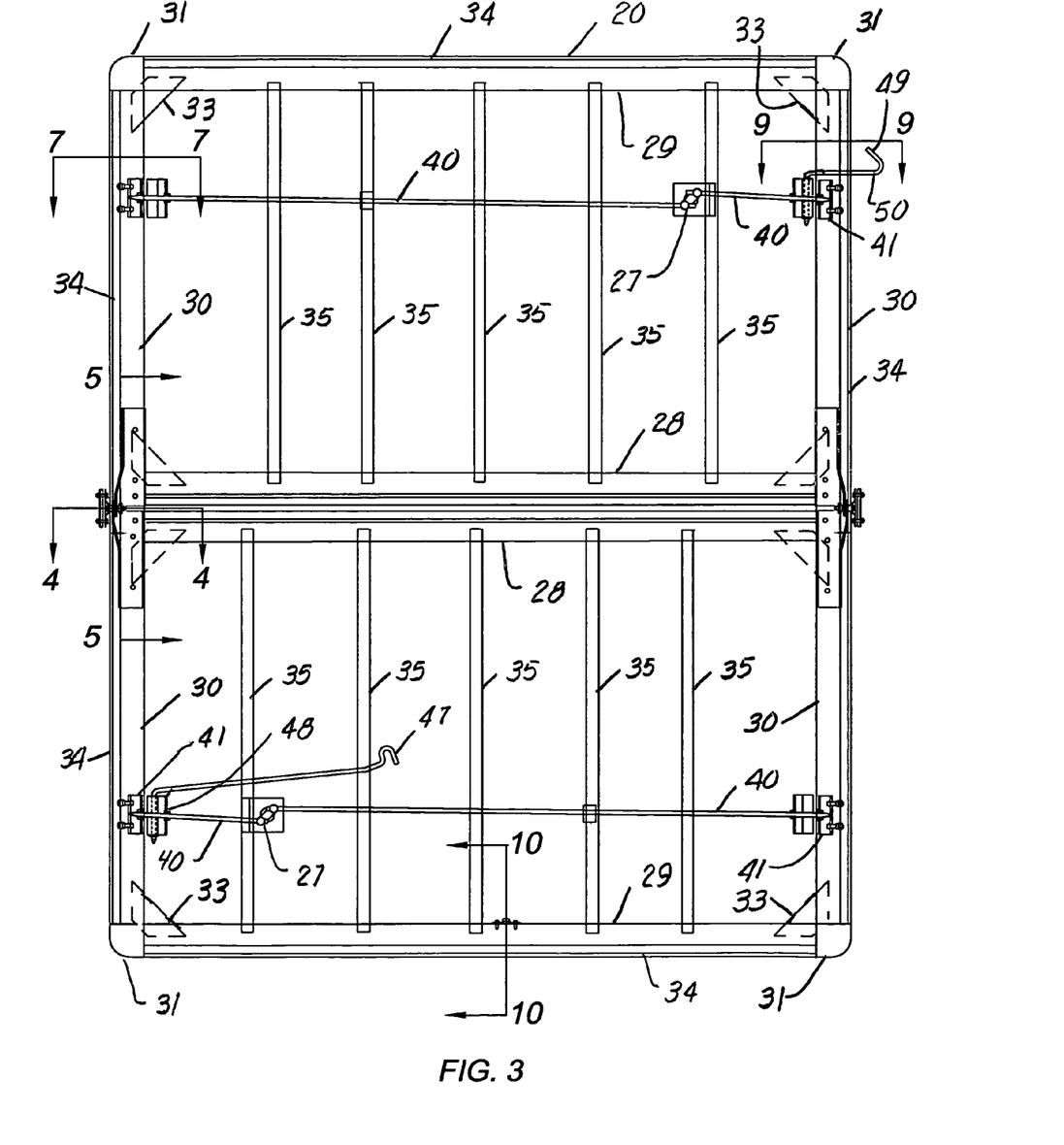
FIG. 3 is a bottom view of the pick-up truck cover.

As shown in FIGS. 1 and 2, the cover 20 is comprised of a front panel 23 and a rear panel 24 connected with a hinge 25 for rotation about a transverse axis. With reference to FIG. 3, the hinge 25 is covered with a thin rubber seal 26 that prevents water from entering the cargo box 21. The sides of the rubber seal 26 are held with flat retainer strips 32. In each of the panels 23, 24 there is a cylinder lock 27 for locking the panels 23, 24 to the cargo box 21. As shown in FIG. 3, each of the panels 23, 24 is bounded by a pair of spaced apart inner 28 and outer 29 transverse cross-members and spaced apart longitudinal side members 30. At each of the outer corners molded plastic elbows 31 engage end portions of the outer members 28, 29, 30. Each outer corner 33 is reinforced with a gusset 31. The gussets 31 are joined to the outer members 28, 29, 30 with drive screws or pop rivets. As shown in FIG.3, a tubular seal is adhesively joined to the lower surfaces of the outer members 28, 29, 30.

Figure 10:
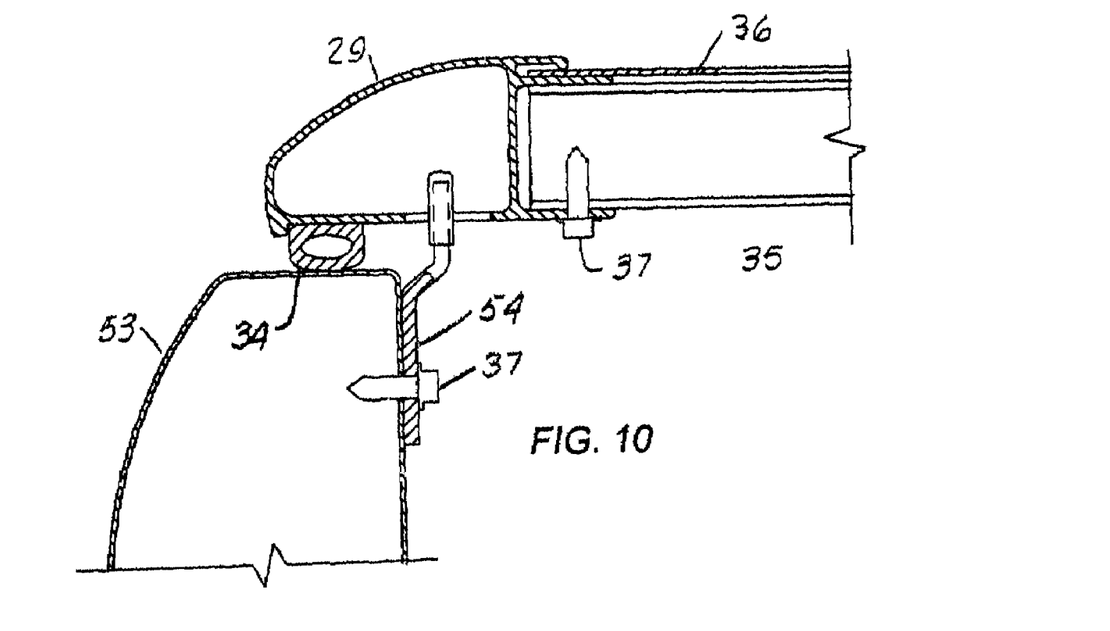
FIG. 10 is a cross-sectional view taken on the line 10-10 in FIG. 3 with the cover closed.
Figure 11:
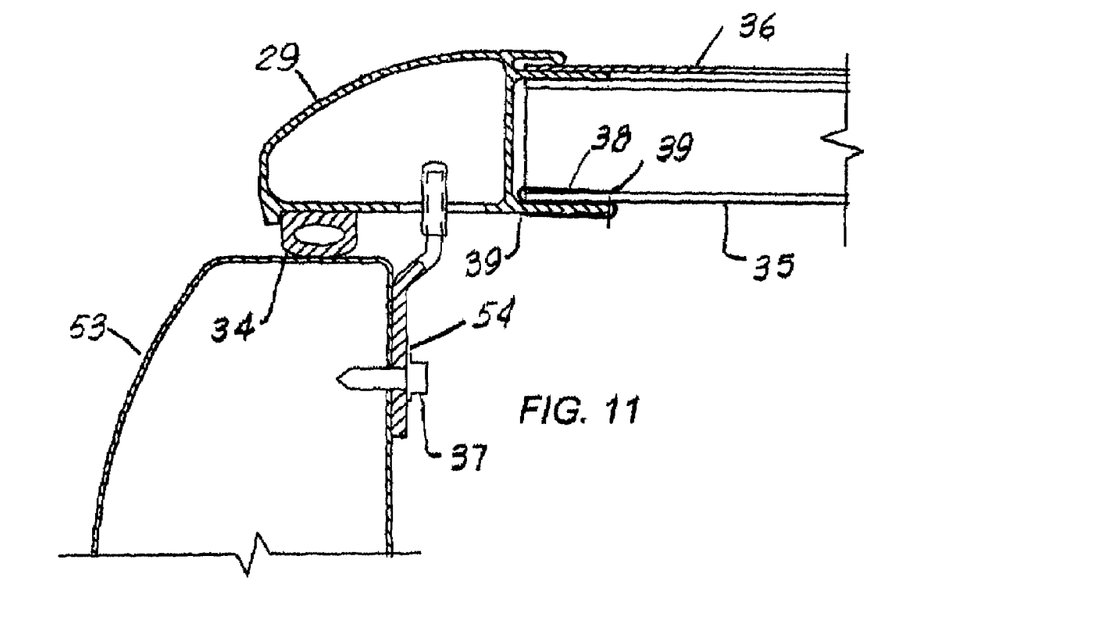
FIG. 11 is an alternate embodiment of FIG. 10 showing a use of stamped S-clip fasteners.

The tops of the panels 23, 24 are covered with thin fiberglass or metal sheets 36. The. side and outer edges of the sheets 36 are retained in channels of the outer members 28, 29, 30. Below the cover sheets 36 are slender longitudinal support members 35. The ends of the longitudinal members 35 are retained in channels of the inner 29 and outer 30 transverse members with drive screws 37 as shown in FIG. 10 or stamped S-clip fasteners 38 as shown in FIG. 11.

The outer members 28, 29, 30 and longitudinal support members 35 are cut from unspecified lengths of aluminum extrusions. As previously noted, the aluminum extrusions are accurate, reduce weight and have good surface finishes. With reference to FIG. 11, the optional stamped S-clip fasteners 38 which retain the slender longitudinal members 35 to the transverse members 28, 29 have pointed portions 39 which penetrate and grip the soft aluminum longitudinal 35 and transverse members 28, 29. The S-clip fasteners 38 reduce cost, eliminate drilled holes, simplify assembly and reduce assembly time.

Figure 7:
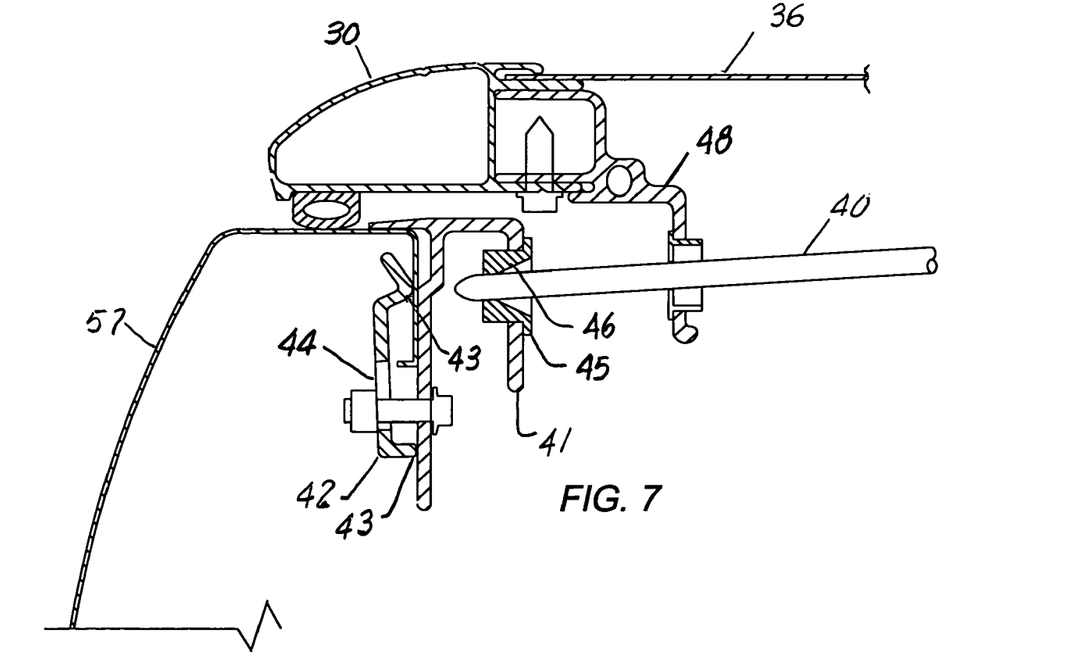
FIG. 7 is a cross-sectional view taken on the line 7-7 in FIG. 3.

Referring now to FIGS. 3 and 7, the cover latching system has a 27 cylinder lock, slender latch rods 40 and a striker 41 which improved over the referenced patent design. The striker 41 is attached to opposite sides of the pick-up truck box 21 with an improved clamp 42. Variations in cargo boxes, especially between different truck models, resulted in problems, such as loose clamping with the clamp of U.S. Pat. No. 6,082,806. In some cases it was not possible to obtain tight clamping. The improved clamp 42 has two widely spaced apart contact points. 43 that insures a reliable clamping over the patented (U.S. Pat. No. 6,082,806) design. A slotted opening 44 is provided to eliminate the vertical adjustment of the patented design that caused other problems in some installations.

With reference to FIG. 7, the improved striker 41 features a bushing with a tapered aperture 46. The tapered aperture 46 compensates for both vertical and longitudinal misalignments between the latch rods 40 and striker 41. The tapered aperture 46 forces the end portion of the latch rod to engage the striker 41. It also pulls the cover 20 down to depress the tubular seal 34.

Referring now to FIG. 3, a prop rod 47, mounted in the cover 20 for rotation, is provided to support the rear cover panel 24 in an open position. The prop rod 47 is pivotally mounted in a bracket 48, cut from an aluminum extrusion and attached to one of the outer side members 30 with a drive screw 37. An identical bracket 48 is used to mount a safety latch 49.

Figures 8, 9:
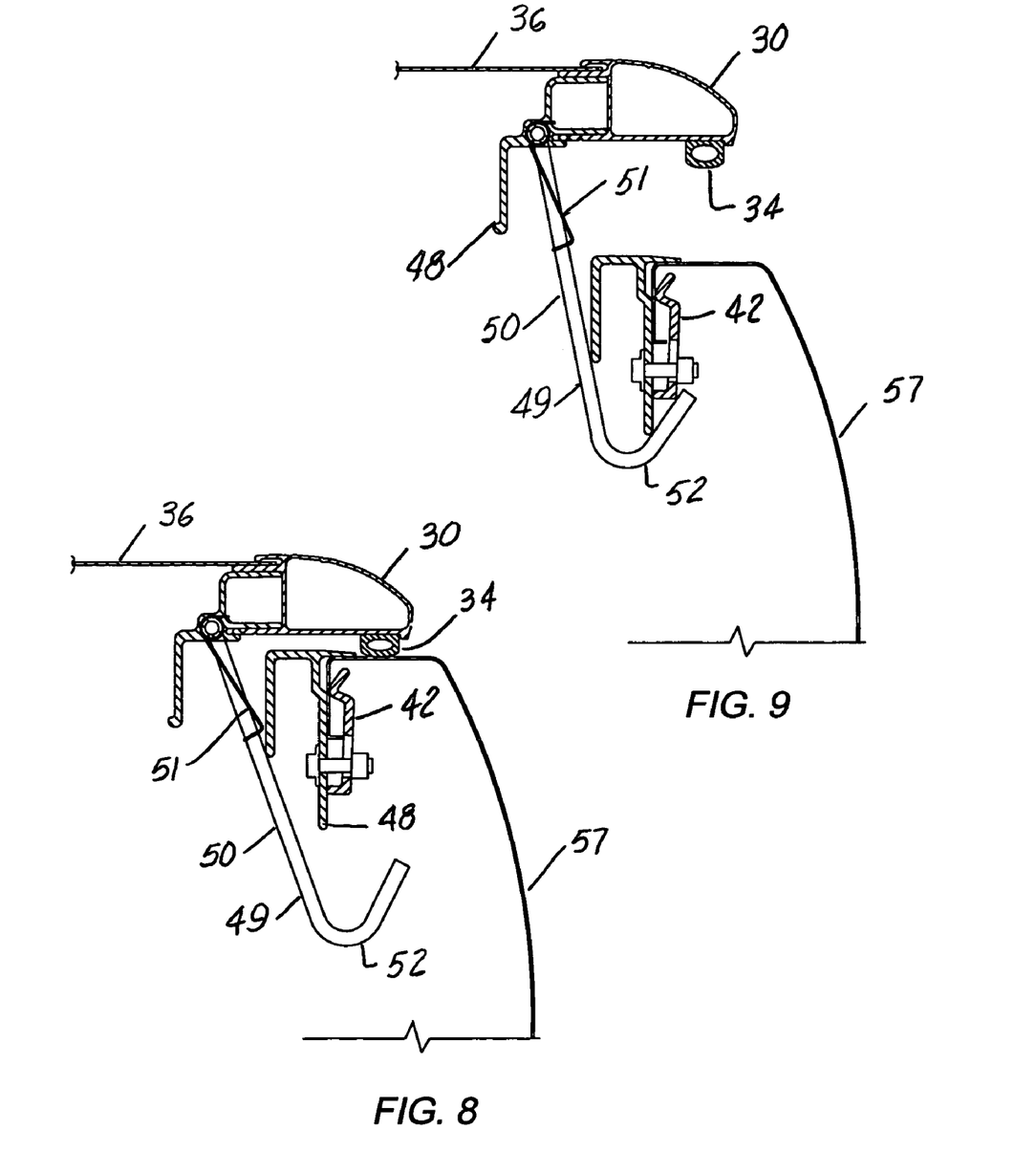
FIG. 8 is a cross-sectional view taken on the line 8-8 in FIG. 3 with the cover closed.
FIG. 9 is a cross-sectional view taken on the line 9-9 in FIG. 3 with the cover partially open.

The safety 49 latch, shown in FIGS. 3, 8 and 9, restrains the cover 20 from suddenly opening if it is improperly latched. The safety latch 49 is comprised of a slender formed rod 50 and a spring 51. The rod 50 is pivotally mounted in a bracket 48 which is attached to one of the outer side members 30. When the cover 20 is closed as shown in FIG. 8, the latch rod 50 is urged outwardly by the wire spring 51. In FIG. 9 the safety latch 49 is shown restraining the cover 20 which is improperly latched. A hooked end lower portion 52 of the rod 50 prevents the cover 20 from opening more than a small amount. To fully open the cover 20, the latch rod 50 must be manually disengaged and rotated inwardly to clear the cover 20.

The improved means for locking the tailgate 53 of the pick-up truck 22 is shown in FIGS. 10 and 11. The tailgate latch of U.S. Pat. No. 6,082,806 was structurally inadequate. The tailgate locking means, as shown in FIGS. 10 and 11, is comprised of a stamped latch 54 attached to a rear wall of said tailgate and an aperture in the outer, transverse member 29 of one of the cover panels 24 for engaging the latch 54 when the panel 24 is closed.

Figure 4:
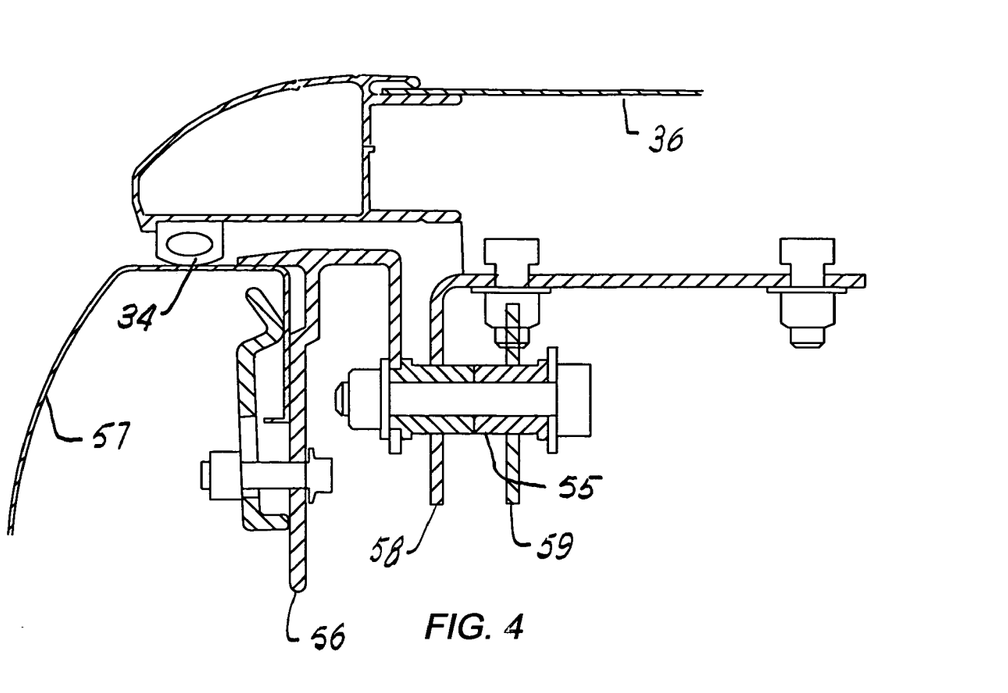
FIG. 4 is a cross-sectional view taken on the line 4-4 in FIG. 3.
Figure 5:
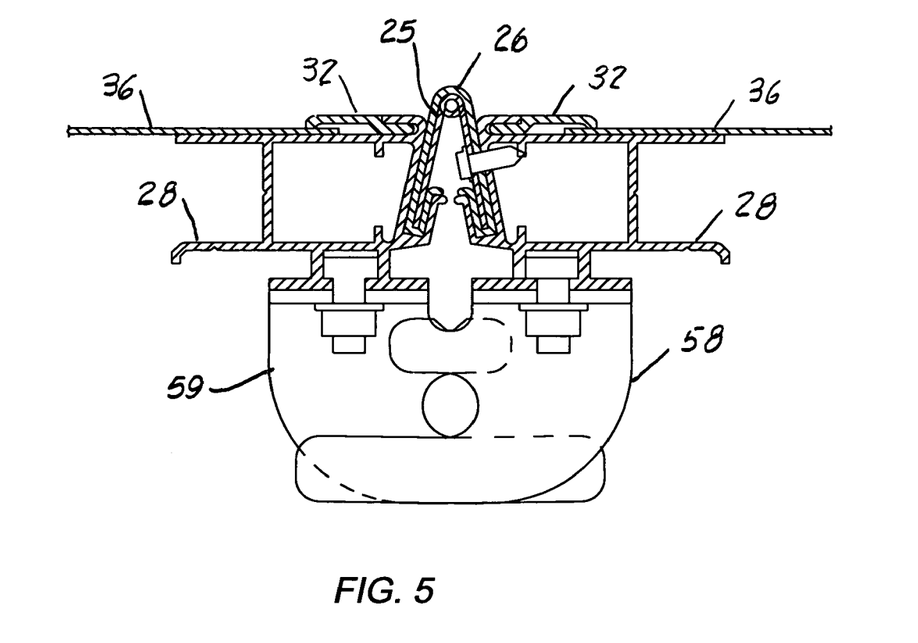
FIG. 5 is a cross-sectional view taken on the line 5-5 in FIG. 3 with the cover closed.
Figure 6:
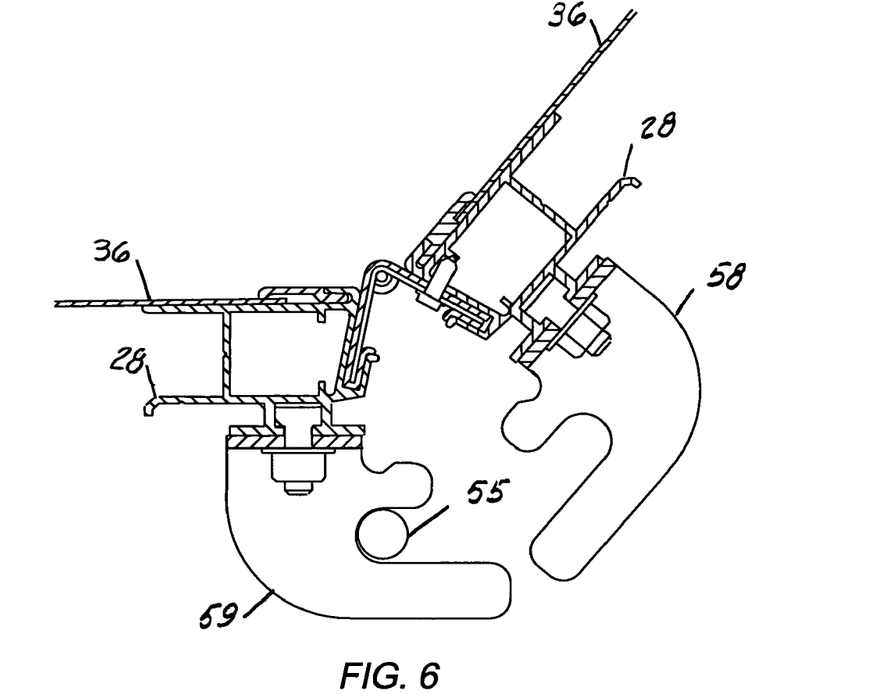
FIG. 6 is a cross-sectional view taken on the line 6-6 in FIG. 3 with the cover partially open.

The attachment of the cover 20 to the cargo box 21 can be best understood by reference to FIGS. 4, 5 and 6. Pivot shafts 55 mounted on brackets 56 extend inwardly from cargo box sides 57. Referring to FIG. 4, the brackets 56 are clamped to the cargo box 21 with the improved clamp 42. The clamps allow the pivot shafts 49 to be moved longitudinally to align the cover 20 with the cargo box 21.

Referring to FIGS. 5 and 6, when the front 23 and/or rear 24 panels are opened, complementary hinge members 58, 59, which are attached to the cover 20, separate, disengaging the pivot shafts 55, allowing the cover 20 to be installed or removed from the cargo box 21. As shown in FIG. 5, when the panels 23, 24 are closed, the complementary members 58, 59 close around the pivot shafts 55 to prevent the cover 20 from being removed. Thus the installation and removal of the cover 20 is simple, quick and convenient.

Figures 12, 13:
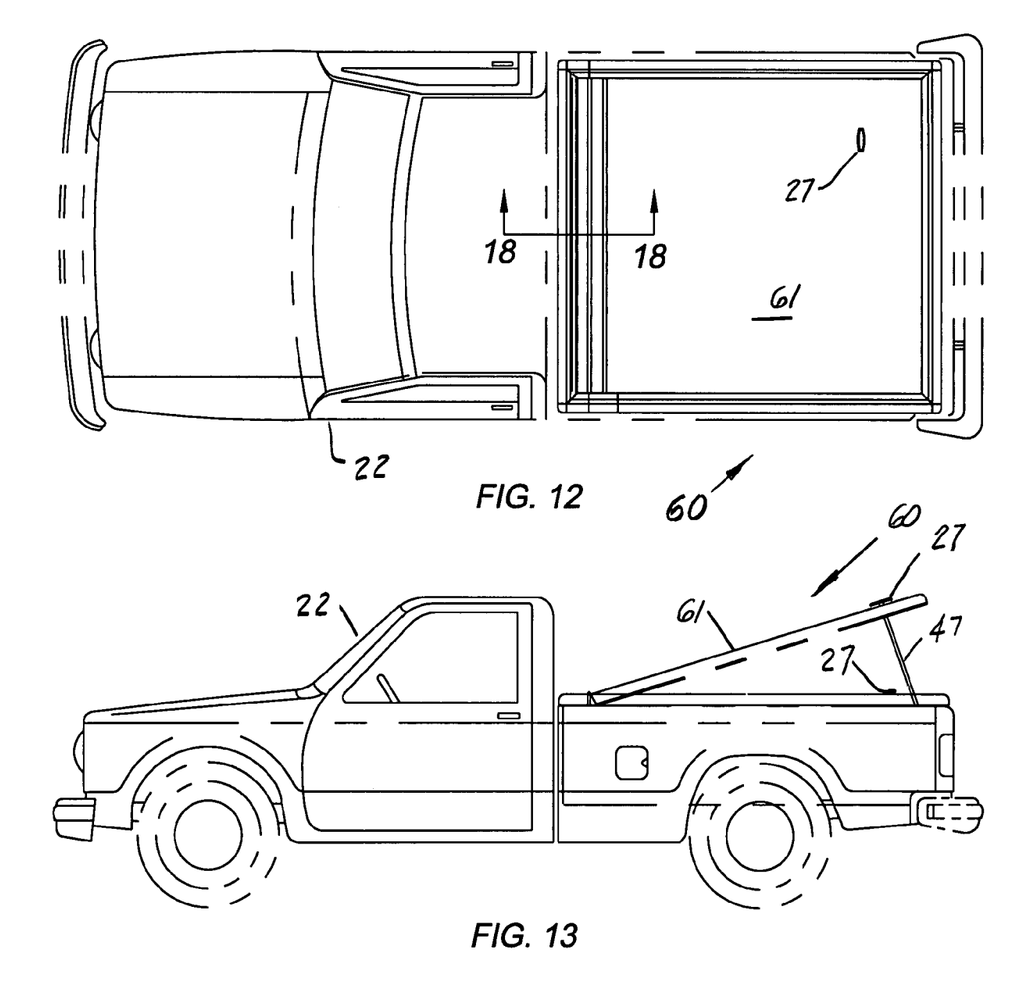
FIG. 12 is a plan view of an alternate embodiment of FIG. 1.
FIG. 13 is a side view of the FIG. 12 alternate embodiment.
Figure 18:
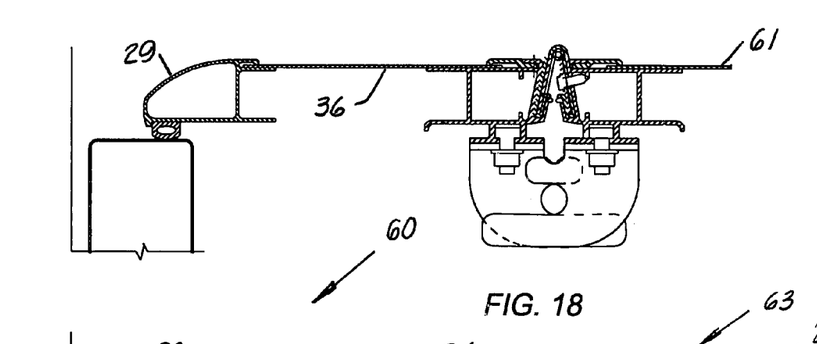
FIG. 18 is a cross-sectional view taken on the line 18-18 in FIG. 12.

An embodiment 60 is shown in FIGS. 12, 13 and 18, mounted for rotation on a pick-up truck 22 which requires only a single panel 61, single lock and single cover latch.

Figure 14:
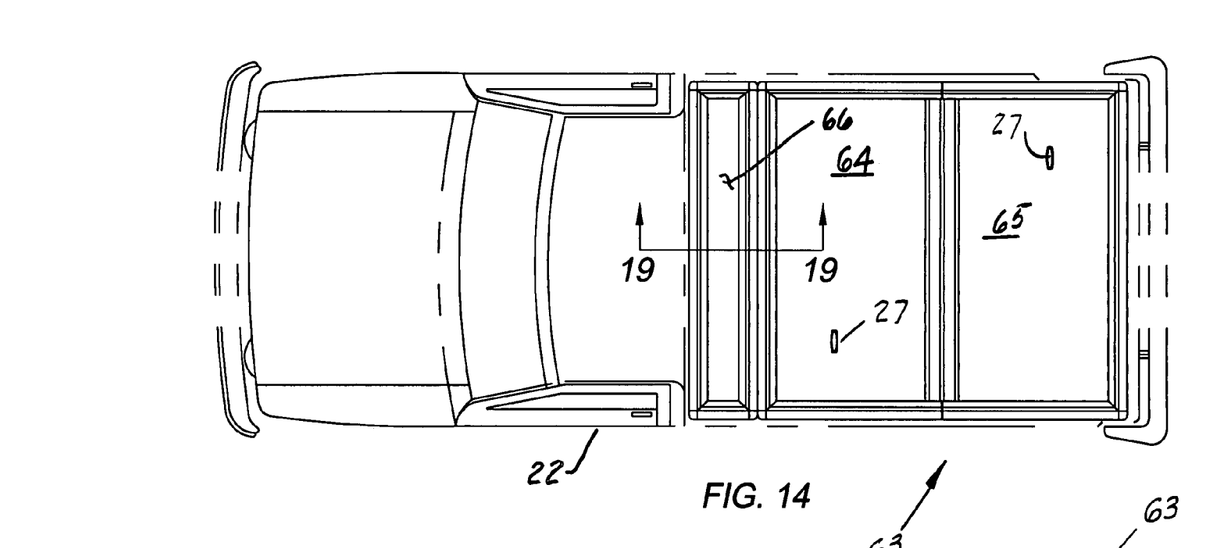
FIG. 14 is a plan view of another alternate embodiment of FIG. 1.
Figure 15:
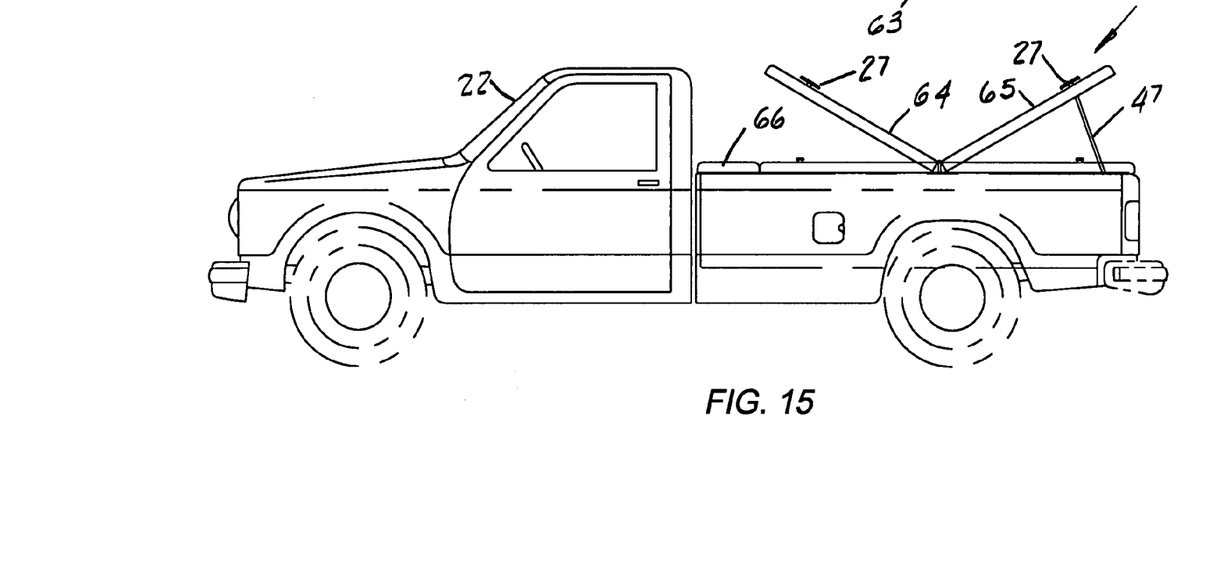
FIG. 15 is a side view of the FIG. 14 alternate embodiment.
Figure 19:
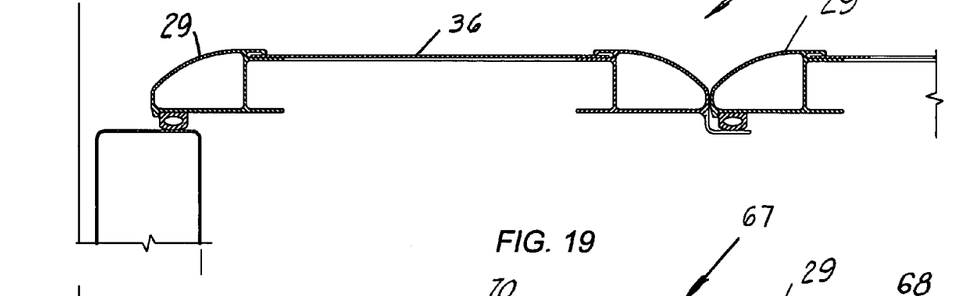
FIG. 19 is a cross-sectional view taken on the line 19-19 in FIG. 14.

In FIGS. 14, 15 and 19, an embodiment 63 is shown consisting of a standard pair of rotatable panels 64, 65 and an adjustable panel 66 whose length is varied to accommodate differences in cargo boxes 21. This "one size fits all" embodiment 63 can be used for reducing inventory. The length of the panel 66 is varied by providing to a buyer an unspecified length of the side outer member 30 and cover sheet 36.

Figure 16:
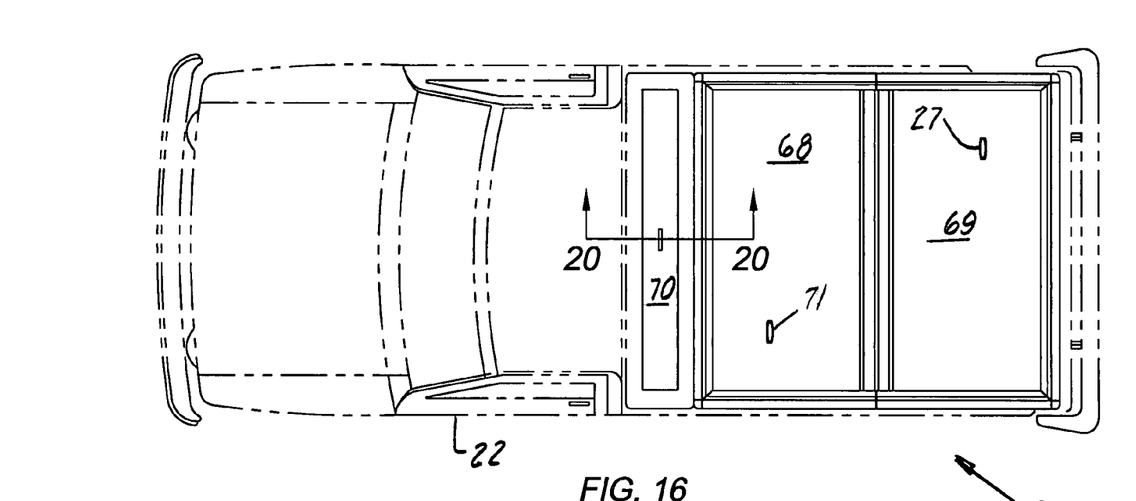
FIG. 16 is a plan view of another alternate embodiment of FIG. 1.
Figure 17:
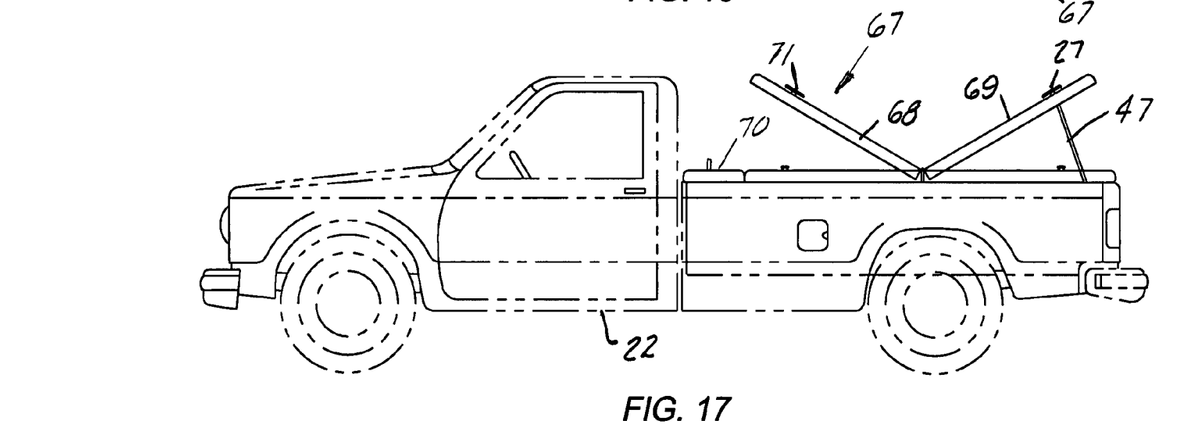
FIG. 17 is a side view of the FIG. 16 alternate embodiment.
Figure 20:
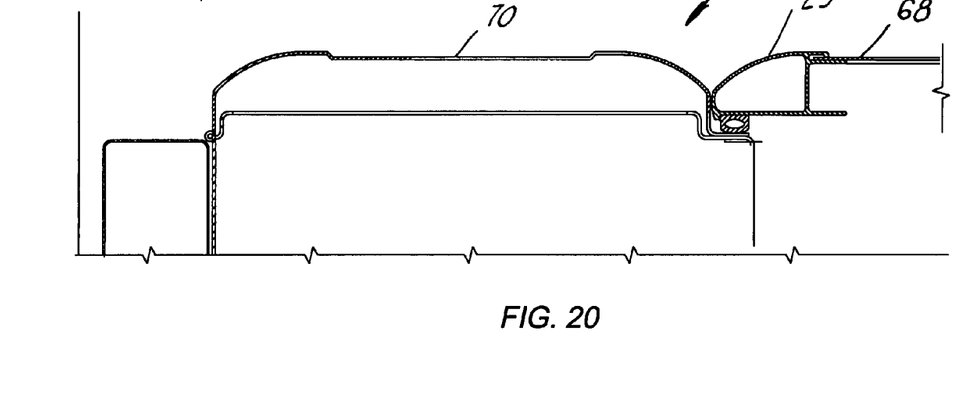
FIG. 20 is a cross-sectional view taken on the line 20-20 in FIG. 16.

In FIGS. 16, 17 and 20, an embodiment is shown consisting of a pair of rotatable panels 68, 69 in combination with a tool box 70 which share a common lock 71. These embodiments are derived from the inventory of common parts.

Since numerous alterations or modifications can be made in the preferred embodiment, without departing from the scope of this invention, the following detailed disclosure is intended as an example for achieving the present invention and is not intended, in any way, to limit the scope of the invention.

What is claimed is:

1. A cover for enclosing a cargo box of a pick-up truck, said cover assembled from an inventory of common parts, comprising: a pair of pivotally connected panels, each of said panels rotatable about a transverse axis between an open position and a closed position on said cargo box and bounded by a pair of slender spaced apart side members, a slender inner transverse member and a slender outer transverse member, said side and transverse members being cut from unspecified lengths of extruded stock to conform to the length and width of said cargo box; stamped S-clip fasteners for connecting said side and transverse members; elbows for joining together end portions of said bounding members to form outer corners of said panels; a gusset in each of said corners for reinforcing said panels, a hinge for pivotally connecting said panels, a thin rubber seal in covering relationship to said hinge to prevent water from entering said cargo box, a thin retaining strip on each side of said seal for sealing the sides of said seal; a plurality of slender longitudinal support members between said spaced apart side members, said longitudinal support members being cut from unspecified lengths of extruded stock to conform to the length of said cargo box and extending between said spaced apart transverse members; a means in each of said panels for locking said panels to said pick-up truck, a thin cover on the top of each of said panels, said covers extending between said bounding members; and a safety latch pivotally mounted in at least one of said panels for preventing a sudden opening of said panel if said panel is improperly latched, said safety latch comprised of a slender wire latch and a spring for outwardly biasing said slender wire latch.

2. A cover for enclosing a cargo box of a pick-up truck, said cover assembled from an inventory of common parts, comprising: a pair of pivotally connected panels, each of said panels rotatable about a transverse axis between an open position and a closed position on said cargo box and bounded by a pair of slender spaced apart side members, a slender inner transverse member and a slender outer transverse member, said side and transverse members being cut from unspecified lengths of extruded stock to conform to the length and width of said cargo box; elbows for joining together end portions of said bounding members to form outer corners of said panels; a gusset in each of said corners for reinforcing said panels, a hinge for pivotally connecting said panels, a thin rubber seal in covering relationship to said hinge to prevent water from entering said cargo box, a thin retaining strip on each side of said seal for sealing the sides of said seal; a plurality of slender longitudinal support members between said spaced apart side members, said longitudinal support members being cut from unspecified lengths of extruded stock to conform to the length of said cargo box and extending between said spaced apart transverse members; a means in each of said panels for locking said panels to said pick-up truck, a thin cover on the top of each of said panels, said means for locking each of said panels comprised of a pair of slender rods slidably mounted in each of said panels for transverse movements in opposite directions in said cover; a T-handle rotatably mounted in said cover, a lever attached to said handle for rotating a cylinder lock to move said rods in opposite directions; and a striker attached to opposite sides of said pick-up truck side structures for receiving end portions of said transverse rods, said strikers having tapered apertures for compensating for misalignment of said strikers and end portions of said transverse rods said covers extending between said bounding members; and a safety latch pivotally mounted in at least one of said panels for preventing a sudden opening of said panel if said panel is improperly latched, said safety latch comprised of a slender wire latch and a spring for outwardly biasing said slender wire latch.

3. The pick-up truck cover recited in claim 2 wherein said cover members are connected with drive screws.

4. A cover for enclosing a cargo box of a pick-up truck, said cover assembled from an inventory of common parts, comprising: a pair of pivotally connected panels, each of said panels rotatable about a transverse axis between an open position and a closed position on said cargo box and bounded by a pair of slender spaced apart side members, a slender inner transverse member and a slender outer transverse member, said side and transverse members being cut from unspecified lengths of extruded stock to conform to the length and width of said cargo box; elbows for joining together end portions of said bounding members to form outer corners of said panels; a gusset in each of said corners for reinforcing said panels, a hinge for pivotally connecting said panels, a thin rubber seal in covering relationship to said hinge to prevent water from entering said cargo box, a thin retaining strip on each side of said seal for sealing the sides of said seal; a plurality of slender longitudinal support members between said spaced apart side members, said longitudinal support members being cut from unspecified lengths of extruded stock to conform to the length of said cargo box and extending between said spaced apart transverse members; a means in each of said panels for locking said panels to said pick-up truck, a thin cover on the top of each of said panels, said covers extending between said bounding members; a safety latch pivotally mounted in at least one of said panels for preventing a sudden opening of said panel if said panel is improperly latched, said safety latch comprised of a slender wire latch and a spring for outwardly biasing said slender wire latch; and a means for mounting and aligning said panels on said pick-up truck, said means comprising: a pair of inward extending pivot shafts mounted on opposite sides of said pick-up truck; a pivot shaft bracket attached to each of said pivot shafts for mounting said pivot shafts to said pick-up truck, and a clamp for attaching each of said pivot shaft brackets to said pick-up truck, said clamp having spaced apart bearing surfaces for tightly clamping said bracket to said pick-up truck and a slotted aperture for receiving a clamping screw, the positions of each of said pivot shaft brackets being adjustable for longitudinally aligning said cover with said pick-up truck; a pair of hinges mounted on opposite sides of said cover for engaging said pivot shafts; the position of each of said hinges on said cover being adjustable for transversely aligning said cover on said pick-up truck, each of said hinges comprised of complementary hinge members for engaging said pivot shafts when said cover panels are closed and for disengaging said pivot shafts when said cover panels are fully open to remove or install said cover on said pick-up truck.

5. The pick-up truck cover recited in claim 4 further comprising a means for locking a tailgate of said pick-up truck when said cover is mounted on said pick-up truck, said means comprising an upward extending latch mounted on an inside surface of said tailgate and an aperture in one of said slender outer transverse members for receiving an end portion of said latch when said cover is closed.

6. The pick-up truck cover recited in claim 4 further comprising a prop rod pivotally attached to one of said cover panels for supporting said panel in an open position.

7. A cover for enclosing a cargo box of a pick-up truck, comprising: a pair of pivotally connected rectangular panels, each of said panels being rotatable from a closed position to an open position when mounted on said pick-up truck and bounded by a pair of slender spaced apart side members, a slender inner transverse member and a slender spaced apart outer transverse member, said side and transverse members being cut from unspecified lengths of extruded stock to conform to the length and width of said cargo box, said bounding members having end portions joined to each other with molded plastic elbows to form outer corners of said panels; a gusset in each of said outer corners for reinforcing said panels, a hinge for pivotally connecting said panels, a thin rubber seal in covering relationship to said hinge to prevent water from entering said cargo box; a plurality of slender longitudinal support members between said spaced apart side members, said longitudinal support members being cut from unspecified lengths of extruded stock to conform to the length of said cargo box and having end portions joined to said transverse bounding members with stamped S-clip fasteners, a means in each of said panels for locking said panels to said pick-up truck, a thin cover on the top of each of said panels, and a safety latch pivotally mounted in at least one of said panels for limiting an opening of said panel when said panel is improperly latched, said safety latch comprised of a slender wire latch and a spring for outwardly biasing a hook end portion of said latch.

8. The cover for enclosing a cargo box of a pick-up truck recited in claim 7 further comprising a tubular seal on the bottom of said slender spaced apart side members, said slender inner transverse member and said slender spaced apart outer transverse member.

* * * * *